(12) United States Patent
Hayasaki et al.

(10) Patent No.: US 10,816,709 B2
(45) Date of Patent: Oct. 27, 2020

(54) LIGHT REFLECTION FILM AND LAMINATE HAVING THE LIGHT REFLECTION FILM

(71) Applicant: Nippon Kayaku Kabushiki Kaisha, Chiyoda-ku, Tokyo (JP)

(72) Inventors: Tomoyuki Hayasaki, Tokyo (JP); Hitoshi Asami, Tokyo (JP); Yoshiyuki Yahagi, Tokyo (JP); Kouichi Tanaka, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 13 days.

(21) Appl. No.: 16/458,513

(22) Filed: Jul. 1, 2019

(65) Prior Publication Data

US 2019/0324180 A1 Oct. 24, 2019

Related U.S. Application Data

(60) Division of application No. 15/624,808, filed on Jun. 16, 2017, now abandoned, which is a continuation of
(Continued)

(30) Foreign Application Priority Data

Dec. 19, 2014 (JP) .................. 2014-257300

(51) Int. Cl.
*G02B 5/30* (2006.01)
*B32B 7/02* (2019.01)
(Continued)

(52) U.S. Cl.
CPC .............. *G02B 5/3016* (2013.01); *B32B 7/02* (2013.01); *G02B 5/0841* (2013.01); *G02B 5/205* (2013.01);
(Continued)

(58) Field of Classification Search
CPC .. G02B 5/3016; G02B 5/0841; G02B 5/0866; G02B 5/26; G02B 5/3083; G02B 5/205;
(Continued)

(56) References Cited

U.S. PATENT DOCUMENTS

| 4,683,327 A | 7/1987 | Stackman |
| 5,622,648 A | 4/1997 | Parri et al. |

(Continued)

FOREIGN PATENT DOCUMENTS

| CN | 1338656 A | 3/2002 |
| CN | 102354010 A | 2/2012 |

(Continued)

OTHER PUBLICATIONS

Chinese communication, with English translation, dated Feb. 19, 2020 in corresponding Chinese patent application No. 201580069500.3.

(Continued)

*Primary Examiner* — Collin X Beatty
(74) *Attorney, Agent, or Firm* — Nields, Lemack & Frame, LLC

(57) ABSTRACT

A light reflection film includes at least one light reflection layer RPRL in which a cholesteric liquid crystal phase of a right-handed helical structure having right circularly polarized light reflection ability is fixed; and at least one light reflection layer LPRL in which a cholesteric liquid crystal phase of a left-handed helical structure having left circularly polarized light reflection ability is fixed. A total of three or more layers of the light reflection layer(s) RPRL and the light reflection layer(s) LPRL are laminated. The light reflection layer(s) RPRL and the light reflection layer(s) LPRL laminated each have a selective reflection center (Continued)

wavelength shifted by an interval of 10 nm or more and 160 nm or less between two light reflection layers adjacent to each other.

4 Claims, 1 Drawing Sheet

Related U.S. Application Data application No. PCT/JP2015/084952, filed on Dec. 14, 2015.

(51) Int. Cl.
*G02B 5/26* (2006.01)
*G02B 5/08* (2006.01)
*G02B 5/20* (2006.01)
*G02B 27/28* (2006.01)

(52) U.S. Cl.
CPC .............. *G02B 5/26* (2013.01); *G02B 5/305* (2013.01); *G02B 5/3041* (2013.01); *G02B 5/3083* (2013.01); *G02B 27/288* (2013.01)

(58) Field of Classification Search
CPC .... G02B 5/3041; G02B 5/305; G02B 27/288; B32B 17/10458; B32B 17/10449; B32B 7/02
See application file for complete search history.

(56) References Cited

U.S. PATENT DOCUMENTS

| | | | |
|---|---|---|---|
| 5,770,107 A | 6/1998 | Hassall et al. | |
| 6,136,225 A | 10/2000 | Meyer et al. | |
| 6,335,462 B1 | 1/2002 | Etzbach et al. | |
| 6,395,351 B1 | 5/2002 | Benecke et al. | |
| 6,580,482 B1 | 6/2003 | Hiji et al. | |
| 2002/0113921 A1 | 8/2002 | Jiang et al. | |
| 2006/0131522 A1 | 6/2006 | Choi et al. | |
| 2011/0181820 A1 | 7/2011 | Watanabe | |
| 2011/0255035 A1 | 10/2011 | Wu | |
| 2012/0242948 A1 | 9/2012 | Taguchi et al. | |
| 2014/0284582 A1 | 9/2014 | Saitoh et al. | |
| 2015/0192715 A1* | 7/2015 | Taguchi | B32B 17/10036 349/98 |
| 2017/0261667 A1 | 9/2017 | Anzai et al. | |
| 2017/0285235 A1 | 10/2017 | Hayasaki et al. | |

FOREIGN PATENT DOCUMENTS

| | | |
|---|---|---|
| CN | 102692664 A | 9/2012 |
| CN | 107003454 A | 8/2017 |
| EP | 2899574 A1 | 7/2015 |
| JP | 1-272551 A | 10/1989 |
| JP | 6-16616 A | 1/1994 |
| JP | 7-110469 A | 4/1995 |
| JP | 11-80081 A | 3/1999 |
| JP | 2001-328973 A | 11/2001 |
| JP | 2002-179668 A | 6/2002 |
| JP | 2003-287623 A | 10/2003 |
| JP | 2003-294948 A | 10/2003 |
| JP | 4133839 B2 | 8/2008 |
| JP | 2011-154215 A | 8/2011 |
| JP | 2013-64890 A | 4/2013 |
| JP | 2013-72985 A | 4/2013 |
| JP | 2014-59437 A | 4/2014 |
| JP | 2014-119605 A | 6/2014 |
| TW | 513601 B | 12/2002 |
| WO | 95/22586 A1 | 8/1995 |
| WO | 95/24455 A1 | 9/1995 |
| WO | 97/00600 A2 | 1/1997 |
| WO | 98/23580 A1 | 6/1998 |
| WO | 98/52905 A1 | 11/1998 |
| WO | 2015/125908 A1 | 8/2015 |

OTHER PUBLICATIONS

International Search Report dated Mar. 15, 2016 in corresponding PCT application No. PCT/JP2015/084952.
International Search Report and Written Opinion dated Mar. 15, 2016 in corresponding PCT application No. PCT/JP2015/084952.
International Preliminary Report on Patentability dated Jun. 20, 2017 in corresponding PCT application No. PCT/JP2015/084952.
European communication dated Aug. 1, 2018 in corresponding European patent application No. 15869937.1.
Chinese communication, with English translation, dated Feb. 2, 2019 in corresponding Chinese patent application No. 201580069500.3.
Taiwanese communication, with English translation, dated Apr. 9, 2019 in corresponding Taiwanese patent application No. 104142489.
Broer et al., "In-situ photopolymerization of oriented liquid-crystalline acrylates, 3," Macromolecular Chemistry and Physics, vol. 190, pp. 2255-2268, 1989.
Geibel et al., "In Situ Photopolymerized, Oriented Liquid-Crystalline Diacrylates with High Thermal Conductivities," Advanced Materials, vol. 5, pp. 107-109, 1993.
A. H. Gevorgyan. Optical Properties of a Stack of Right and LeftHanded Layers of a Cholesteric Liquid Crystal. ISSN 0030400X, Optics and Spectroscopy, 2012, vol. 113, No. 2, pp. 141-152. © Pleiades Publishing, Ltd., 2012. Original Russian Text© A. H. Gevorgyan, 2012, published in Optika i Spektroskopiya, 2012, vol. 113, No. 2, pp. 162-174.
Goto et al., "New Nematics with High Birefringence," Molecular Crystals and Liquid Crystals, vol. 260, pp. 23-28, 1995.
Ekisho Debaisu Handobukku (Liquid Crystal Device Handbook), Chapter 3, Section 4-3, TN, STN yo Kairaruzai (Chiral Agents for TN and STN), pp. 199-203, 142nd Committee of Japan Society for the Promotion of Science ed., 1989.
Office action dated Jul. 25, 2018 in co-pending U.S. Appl. No. 15/624,808.
Final rejection dated Feb. 4, 2019 in co-pending U.S. Appl. No. 15/624,808.
European communication dated Dec. 5, 2019 in corresponding European patent application No. 15869937.1.
European communication dated May 27, 2019 in corresponding European patent application No. 15869937.1.
Chinese communication, with English translation, dated Sep. 20, 2019 in corresponding Chinese patent application No. 201580069500.3.
Japanese communication, with English translation, dated Oct. 7, 2019 in corresponding Japanese patent application No. 2016-564843.

* cited by examiner

LIGHT REFLECTION FILM AND LAMINATE HAVING THE LIGHT REFLECTION FILM

CROSS REFERENCE TO RELATED APPLICATIONS

This application is a divisional of U.S. patent application Ser. No. 15/624,808 filed Jun. 16, 2017, which is a continuation application of International Patent Application No. PCT/JP2015/084952 filed Dec. 14, 2015, which claims the benefit of Japanese Patent Application No. 2014-257300, filed Dec. 19, 2014, the full contents of all of which are hereby incorporated by reference in their entirety.

BACKGROUND

Technical Field

The present disclosure relates to a light reflection film having a cholesteric liquid crystal that has a low haze value and wide reflection band width, and a laminate having the light reflection film. This light reflection film is mainly applied to heat shield films for building materials, in-vehicle use, and the like, optical members such as brightness enhancement films and color filters, and optical films utilized for eyewear (sunglasses, goggles, visors for helmets, and the like).

Background

A cholesteric liquid crystal having a circularly polarized light separation function has the selective reflection properties of reflecting only such circularly polarized light that has a circular polarization direction matching the helical rotation direction of the liquid crystal and has a wavelength like a helical pitch of the liquid crystal. Because of these selective reflection properties, the cholesteric liquid crystal is utilized for optical members, for example, brightness enhancement films and color filters.

However, the selective reflection properties of the cholesteric liquid crystal are limited to only a particular wavelength band, and the development of an optical member exhibiting selective reflection properties in a wider wavelength band is desired.

The selective reflection wavelength region width $\Delta\lambda$ of the cholesteric liquid crystal is represented by $$\Delta\lambda = 2\lambda \cdot (ne-no)/(ne+no)$$

no: the refractive index of the cholesteric liquid crystal molecules with respect to normal light
ne: the refractive index of the cholesteric liquid crystal molecules with respect to extraordinary light
$\lambda$: the selective reflection center wavelength and depends on the molecular structure of the cholesteric liquid crystal itself.

From the above formula, when ne−no is increased, the selective reflection wavelength region width $\Delta\lambda$ is widened, but ne−no is usually 0.3 or less. When this value is increased, other functions (orientation properties, liquid crystal temperature, and the like) as the liquid crystal are insufficient, resulting in a difficulty in practical use. Therefore, actually, the selective reflection wavelength region width $\Delta\lambda$ is about 150 nm at the maximum. Many of those practicable as cholesteric liquid crystals have a selective reflection wavelength region width $\Delta\lambda$ of about 30 to 80 nm under the present circumstances.

The selective reflection center wavelength $\lambda$ is represented by $$\lambda = (ne+no)P/2$$

P: the helical pitch length required for the one-rotation twist of the cholesteric liquid crystal
and depends on the average refractive index of the liquid crystal molecules and the pitch length when the pitch is constant.

Thus, a method in which for widening a reflection band, ultraviolet polymerization is performed under special conditions to continuously change pitch length in the thickness direction to form a presence distribution of selective reflection center wavelengths themselves is proposed (e.g., see Japanese Patent No. 4133839 and Japanese Laid-Open Patent Publication No. 2013-64890).

In the method in which ultraviolet polymerization is performed under special conditions to continuously change pitch length in the thickness direction to form a presence distribution of selective reflection center wavelengths themselves described in Japanese Patent No. 4133839 and Japanese Laid-Open Patent Publication No. 2013-64890, when a cholesteric liquid crystal composition is cured by ultraviolet exposure, a difference is made in exposure intensity between the exposure surface side portion and exit surface side portion of the cholesteric liquid crystal composition to make a difference in polymerization rate to provide in the thickness direction the composition ratio change of the liquid crystal composition with different reaction rates. However, a problem of this method is that the manufacturing process is complicated, for example, ultraviolet irradiation is needed for long time, the main curing step of performing high intensity ultraviolet irradiation is needed after band widening in a semi-cured state, and heating during curing by ultraviolet irradiation is further needed. Another problem is that yellowing occurs in the obtained film by ultraviolet irradiation, and the appearance worsens.

Further, in the above method, in order to exhibit reflection performance of 40% or more with respect to incident light over a wide band, it is necessary to increase the thickness of a light reflection layer using a cholesteric liquid crystal to about 10 μm. However, a problem is that when the thickness of the light reflection layer is increased too much, orientation defect of the cholesteric liquid crystal occurs, thereby causing an increase in the haze value of the obtained light reflection film. Thus, such a light reflection film is unsuitable for use for an optical member of which a low haze value is required. In addition, with only a cholesteric liquid crystal layer of a helical structure in which the rotation direction of the helix is either one of the right-handed direction and the left-handed direction, it is theoretically impossible to obtain a light reflection film exhibiting reflection performance of more than 50% with respect to incident light. Therefore, such a light reflection film is unsuitable for use for an optical member of which in addition to a low haze value, reflection performance of more than 50% with respect to incident light is required.

The present disclosure is related to providing a light reflection film having a low haze value and further exhibiting a reflectance of more than 50% in a relatively wide wavelength band and a laminate having the light reflection film.

SUMMARY

According to a first aspect of the present disclosure, a light reflection film includes at least one light reflection layer RPRL in which a cholesteric liquid crystal phase of a right-handed helical structure having right circularly polarized light reflection ability is fixed, and at least one light reflection layer LPRL in which a cholesteric liquid crystal phase of a left-handed helical structure having left circularly polarized light reflection ability is fixed, a total of three or more layers of the light reflection layer(s) RPRL and the light reflection layer(s) LPRL are laminated, and the light reflection layer(s) RPRL and the light reflection layer(s) LPRL laminated each have a selective reflection center wavelength shifted by an interval of 10 nm or more and 160 nm or less between two light reflection layers adjacent to each other.

Further, it is preferable that the light reflection film has a region that reflects more than 50% and 95% or less of light with respect to incident light.

Further, it is preferable that the light reflection film has a haze value (Hz) of 1.0% or less.

Further, it is preferable that each of the light reflection layer has a thickness of 0.5 µm or more and 5 µm or less.

According to a second aspect of the present disclosure, a laminate includes a light reflection film and a base material, the light reflection film includes at least one light reflection layer RPRL in which a cholesteric liquid crystal phase of a right-handed helical structure having right circularly polarized light reflection ability is fixed, and at least one light reflection layer LPRL in which a cholesteric liquid crystal phase of a left-handed helical structure having left circularly polarized light reflection ability is fixed, a total of three or more layers of the light reflection layer(s) RPRL and the light reflection layer(s) LPRL are laminated, and the light reflection layer(s) RPRL and the light reflection layer(s) LPRL laminated each have a selective reflection center wavelength shifted by an interval of 10 nm or more and 160 nm or less between two light reflection layers adjacent to each other.

According to the present disclosure, PRL is an abbreviation of Polarized light Reflection Layer and is an alphabetical expression meaning a light reflection layer. A light reflection layer RPRL represents a light reflection layer having a cholesteric liquid crystal layer of a right-handed helical structure, and a light reflection layer LPRL represents a light reflection layer having a cholesteric liquid crystal layer of a left-handed helical structure.

According to the present disclosure, it is possible to provide a light reflection film having a low haze value and further exhibiting a reflectance of more than 50% in a relatively wide wavelength band and a laminate having the light reflection film.

DETAILED DESCRIPTION

Preferred embodiments of the present disclosure will be described with reference to the accompanying drawings. Note that an embodiment below is an exemplary embodiment, and various embodiments are possible within a scope of the present disclosure.

A numerical value range represented using "to" means a range including the numerical values described before and after "to" as the lower limit value and the upper limit value.

A cholesteric liquid crystal forms a helical structure in which molecules uniformly oriented in one direction form a layer, and for each neighboring molecular layer, the molecule arrangement direction is twisted little by little along the helical axis. A layer in which a cholesteric liquid crystal phase forming such a helical structure and being in a state in which a plurality of molecular layers are laminated is fixed is hereinafter referred to as a cholesteric liquid crystal layer, and the cholesteric liquid crystal layer corresponds to a light reflection layer of the present disclosure. The refractive index anisotropy Δn of a light reflection layer in which a cholesteric liquid crystal phase is fixed means Δn at a wavelength at which selective reflection properties are exhibited (specifically in the vicinity of a wavelength of 500 nm). In order to calculate this refractive index anisotropy Δn, specifically, first, as a sample, a light reflection layer is formed on a substrate (glass or film) subjected to orientation treatment or provided with an orientation film. The selective reflection of the light reflection layer is measured, and its peak width Hw is obtained. In addition, the helical pitch p of the sample is separately measured. The helical pitch p can be measured by observing a cross section using a transmission electron microscope (TEM). By substituting these values into the following formula, the refractive index anisotropy Δn of the sample can be obtained.

$$\Delta n = Hw/p$$

Figure 1:
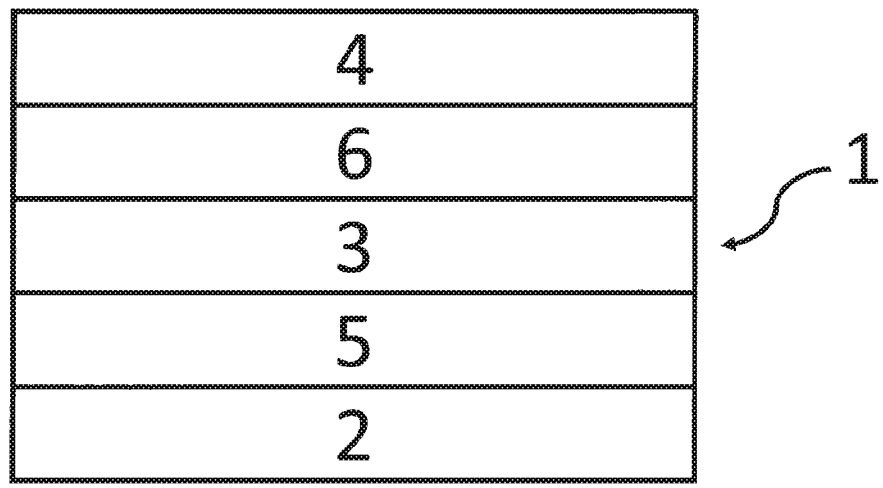
FIG. 1 is a schematic cross-sectional view showing one embodiment of a light reflection film according to the present disclosure.

The light reflection film 1 shown in FIG. 1 is a configuration example in the case of having light reflection layers 2, 3, and 4 in which cholesteric liquid crystal phases are fixed and adhesion layers 5 and 6 comprising an adhesive or a pressure-sensitive adhesive formed between these light reflection layers 2, 3, and 4. When the light reflection layers 2, 3, and 4 can be laminated even without using a pressure-sensitive adhesive or an adhesive, the light reflection film 1 can be formed by directly laminating the light reflection layers 2, 3, and 4 without the adhesion layers 5 and 6.

In one embodiment of the present disclosure, for the light reflection layer 3, in order to widen the reflection band, a cholesteric liquid crystal layer in which the selective reflection center wavelength is on the long wavelength side compared with the cholesteric liquid crystal layer of the light reflection layer 2, and the rotation direction of the helix is opposite is used. Similarly, for the light reflection layer 4, a cholesteric liquid crystal layer in which the selective reflection center wavelength is on the long wavelength side compared with the cholesteric liquid crystal layer of the light reflection layer 3, and the rotation direction of the helix is opposite is used. For example, when a cholesteric liquid crystal layer of a right-handed helical structure (RCLC-2) is used as the light reflection layer 2, a cholesteric liquid crystal layer (LCLC-3) in which the center wavelength is on the long wavelength side compared with the cholesteric liquid crystal layer (RCLC-2) and which is of a left-handed helical structure is used for the light reflection layer 3, and a cholesteric liquid crystal layer (RCLC-4) in which the center wavelength is on the long wavelength side compared with the cholesteric liquid crystal layer (LCLC-3) and which is of a right-handed helical structure is used for the light reflection layer 4. Therefore, the layer configuration of the light reflection film 1 shown in FIG. 1 using such light reflection layers 2, 3, and 4 is RPRL-2/adhesion layer 5/LPRL-3/adhesion layer 6/RPRL-4. In addition, a case where regarding the above layer configuration, instead of the corresponding respective light reflection layers, light reflection layers in which the rotation direction of the helix is opposite are used, that is, a case where the layer configuration of the light reflection film 1 is LPRL-2/adhesion layer 5/RPRL-3/adhesion layer 6/LPRL-4, is possible. The above RCLC (LCLC) is an abbreviation of Right (Left) Cholesteric Liquid Crystal and is an alphabetical expression meaning a cholesteric liquid crystal layer of a right-handed helical structure or a left-handed helical structure, and a number following the above RCLC (LCLC) or RPRL (LPRL) means a number given as the light reflection layer 2, 3, or 4 in FIG. 1. Hereinafter, the same applies.

As another embodiment of the present disclosure, it is possible that for the light reflection layer 3, a cholesteric liquid crystal layer in which compared with the cholesteric liquid crystal layer of the light reflection layer 2, the selective reflection center wavelength is on the short wavelength side, and the rotation direction of the helix is opposite is used, and on the other hand, for the light reflection layer 4, a cholesteric liquid crystal layer in which compared with the cholesteric liquid crystal layer used for the light reflection layer 2, the selective reflection center wavelength is on the long wavelength side, and the rotation direction of the helix is the same is used. In this case, for example, when a cholesteric liquid crystal layer of a right-handed helical structure (RCLC-2) is used as the light reflection layer 2, a cholesteric liquid crystal layer (LCLC-3) in which the center wavelength is on the short wavelength side compared with the cholesteric liquid crystal layer (RCLC-2) and which is of a left-handed helical structure is used for the light reflection layer 3, and a cholesteric liquid crystal layer (RCLC-4) in which the center wavelength is on the long wavelength side compared with the cholesteric liquid crystal layer (RCLC-2) and which is of a right-handed helical structure is used for the light reflection layer 4. In addition, even with a layer configuration in which regarding the above layer configuration, instead of the corresponding respective light reflection layers, light reflection layers in which the rotation direction of the helix is opposite are used, a light reflection film exhibiting similar action as light reflection properties can be obtained.

Further, as another embodiment of the present disclosure, it is possible that for the light reflection layer 3, a cholesteric liquid crystal layer in which compared with the cholesteric liquid crystal layer used for the light reflection layer 2, the selective reflection center wavelength is on the long wavelength side, and the rotation direction of the helix is opposite is used, and on the other hand, for the light reflection layer 4, a cholesteric liquid crystal layer in which compared with the cholesteric liquid crystal layer used for the light reflection layer 2, the selective reflection center wavelength is on the short wavelength side, and the rotation direction of the helix is the same is used. In this case, for example, when a cholesteric liquid crystal layer of a right-handed helical structure (RCLC-2) is used as the light reflection layer 2, a cholesteric liquid crystal layer (LCLC-3) in which the center wavelength is on the long wavelength side compared with the cholesteric liquid crystal layer (RCLC-2) and which is of a left-handed helical structure is used for the light reflection layer 3, and a cholesteric liquid crystal layer (RCLC-4) in which the center wavelength is on the short wavelength side compared with the cholesteric liquid crystal layer (RCLC-2) and which is of a right-handed helical structure is used for the light reflection layer 4. In addition, even with a layer configuration in which regarding the above layer configuration, instead of the corresponding respective light reflection layers, light reflection layers in which the rotation direction of the helix is opposite are used, a light reflection film exhibiting similar action as light reflection properties can be obtained.

In other words, the order of lamination of the light reflection layers 2, 3, and 4 constituting the light reflection film of the present disclosure is not limited to a layer configuration in which the light reflection layers are laminated in descending order of the selective reflection center wavelength or in ascending order of the selective reflection center wavelength, and a layer configuration can be designed as needed.

In the light reflection film of the present disclosure, the order in which a light reflection layer(s) RPRL in which a cholesteric liquid crystal phase(s) of a right-handed helical structure is fixed and a light reflection layer(s) LPRL in which a cholesteric liquid crystal phase(s) of a left-handed helical structure is fixed are laminated is not particularly limited as long as a total of three or more layers of at least one light reflection layer RPRL and at least one light reflection layer LPRL are laminated. For example, in FIG. 1, RPRL-2 as the light reflection layer 2, LPRL-3 as the light reflection layer 3, and RPRL-4 as the light reflection layer 4 may be laminated, and on the other hand, LPRL-2 as the light reflection layer 2, LPRL-3 as the light reflection layer 3, and RPRL-4 as the light reflection layer 4 may be laminated, and RPRL-2 as the light reflection layer 2, RPRL-3 as the light reflection layer 3, and LPRL-4 as the light reflection layer 4 may be laminated.

In the present disclosure, the selective reflection center wavelength of each light reflection layer is not particularly limited, but when the reflection band of each light reflection layer has an overlapping reflection band, a light reflection film exhibiting selective reflection properties over a wide wavelength band in the visible light region or the near-infrared light region can be obtained. Therefore, the selective reflection center wavelength of each light reflection layer in the visible light region is preferably 400 to 700 nm, more preferably 450 to 650 nm, and on the other hand, the selective reflection center wavelength of each light reflection layer in the near-infrared light region is preferably 800 to 1500 nm, more preferably 850 to 1250 nm.

The light reflection layer(s) RPRL and the light reflection layer(s) LPRL laminated in the light reflection film of the present disclosure have selective reflection center wavelengths shifted by an interval of 10 nm to 160 nm from each other and preferably have selective reflection center wavelengths shifted by an interval of 20 nm to 120 nm. When this interval is smaller than 10 nm, the overlap of the reflection bands of the laminated light reflection layers is very large, and as a result, a light reflection film having wide band reflection ability cannot be obtained. On the other hand, when this interval is larger than 160 nm, the overlap of the reflection bands of the laminated light reflection layers is eliminated, and similarly, a light reflection film having wide band reflection performance cannot be obtained. In addition, the interval of the shift between the selective reflection center wavelengths of two light reflection layers selected from the total of three or more layers of the laminated light reflection layer(s) RPRL and light reflection layer(s) LPRL may be the same or different. As the interval of the shift between the center wavelengths decreases, the maximum reflectance increases, but on the other hand, the reflection band having a reflectance of more than 50% narrows. On the contrary, as the interval of the shift between the center wavelengths increases, the reflection band having a reflectance of more than 50% widens, but on the other hand, the maximum reflectance decreases. Therefore, the desired maximum reflectance and reflection band can be selected according to the target application.

Such a light reflection film of the present disclosure in which a total of three or more layers of the light reflection layer(s) RPRL and the light reflection layer(s) LPRL are laminated preferably has a maximum reflectance of more than 50%, more preferably 75% or more, with respect to incident light from the viewpoint of applying the light reflection film to an optical member of which high reflection performance is required. However, the upper limit of this maximum reflectance is about 95% because the member used absorbs a small amount of light. In addition, the width of the reflection band that reflects more than 50% of light with respect to incident light is preferably 80 nm or more, more preferably 100 nm or more, in the visible light region and, on the other hand, is preferably 150 nm or more, more preferably 170 nm or more, in the near-infrared light region. A case where the width of the reflection band that reflects more than 50% of light with respect to incident light is less than 80 nm in the case of the visible light region and is less than 150 nm in the case of the near-infrared light region is no different from a case where two layers of a light reflection layer RPRL and a light reflection layer LPRL each having the same selective reflection center wavelength and helical pitch are simply laminated, and the width of the reflection band is equivalent (about 76 nm in the visible light region and about 147 nm in the near-infrared light region). Therefore, the effect of laminating three or more light reflection layers in the present disclosure, that is, a light reflection film exhibiting a reflectance of more than 50% in a relatively wide wavelength band, cannot be obtained.

The thickness of each light reflection layer is preferably 0.5 μm to 5 μm, more preferably 1 μm to 4 μm. When the thickness of each light reflection layer is less than 0.5 μm, the reflectance of the obtained light reflection film may decrease. On the other hand, when the thickness of the light reflection layer is 5 μm or more, orientation defect of the cholesteric liquid crystal occurs, and due to this, the haze value of the obtained light reflection film may increase.

The haze value of the light reflection film in which three or more light reflection layers are laminated is preferably 1.0% or less, more preferably 0.8% or less. When the haze value is larger than 1.0%, the opacity of the light reflection film is high, and the light reflection film is unsuitable for use for an optical member in which transparency is important.

The above light reflection layers can be formed by various methods. One example is a method of forming the light reflection layer by coating described later. More specifically, the light reflection layer can be formed by coating a surface of a substrate, an orientation layer, or the like with a curable liquid crystal composition that can form a cholesteric liquid crystal layer, turning the composition into a cholesteric liquid crystal phase, and then allowing a curing reaction (for example, a polymerization reaction or a crosslinking reaction) to proceed to fix the cholesteric liquid crystal phase.

Figure 2:
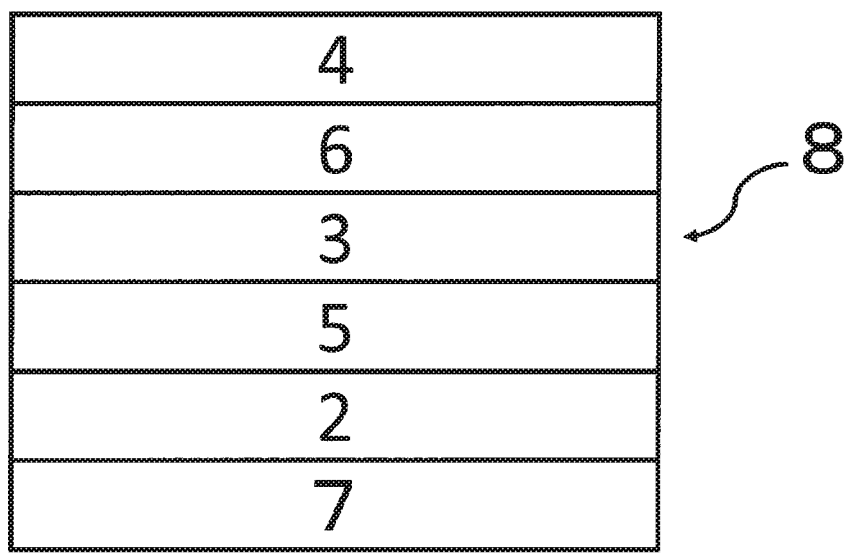
FIG. 2 is a schematic cross-sectional view showing one embodiment of a laminate according to the present disclosure.

The laminate 8 shown in FIG. 2 is a configuration example of the present disclosure in which the light reflection film 1 of the present disclosure is provided on a substrate 7 that is a base material. The material of the substrate 7 is, for example, a polymer film, and its optical properties are not particularly limited.

The laminate 8 of the present disclosure can be formed by various methods. One example is a method of forming the laminate 8 by the bonding of light reflection layers and a base material described later. More specifically, the laminate 8 can be formed by coating a surface of a substrate or a light reflection layer with an adhesive or a pressure-sensitive adhesive, bonding another light reflection layer from the surface, and then allowing a curing reaction (for example, a polymerization reaction or a crosslinking reaction) to proceed for curing, and repeating this step a plurality of times.

The forms of the light reflection film 1 and the laminate 8 of the present disclosure are not limited to the forms shown in FIG. 1 and FIG. 2. In the light reflection film, three or more light reflection layers should be laminated, and the light reflection film may have a configuration in which four or more light reflection layers are laminated. For the order in which the light reflection layers 2, 3, 4, . . . are formed, the light reflection layer 2, the light reflection layer 3, the light reflection layer 4, . . . are laminated in this order in the configurations in FIGS. 1 and 2, but the order is not limited to this order of lamination.

It is found that a light reflection layer formed by fixing a cholesteric liquid crystal phase tends to deteriorate by ultraviolet light irradiation, and particularly deterioration for ultraviolet light having a wavelength of 380 nm or less is significant. Thus, in the present disclosure, for example, by adding a material that absorbs light in the wavelength region (ultraviolet absorbing agent) to a substrate or at least one light reflection layer, or by separately laminating a layer containing the material, for example, a light absorption layer, the deterioration of the light reflection layer can be significantly suppressed.

Next, examples of materials used for the fabrication of the light reflection film and laminate of the present disclosure and methods for fabricating these materials will be described in detail.

<Material for Light Reflection Layer Formation>

In the light reflection layers of the present disclosure, a curable liquid crystal composition is preferably used for the formation of each light reflection layer. For example, the above liquid crystal composition contains at least components of a rod-like liquid crystal compound, an optically active compound (chiral compound), and a polymerization initiator, and for each component, two or more kinds may be contained. For example, a polymerizable liquid crystal compound and a non-polymerizable liquid crystal compound can be used in combination. In addition, a low molecular liquid crystal compound and a polymer liquid crystal compound can also be used in combination. Further, in order to improve the uniformity of orientation, coating suitability, and film strength, at least one selected from various additives such as horizontal orientation agent, an unevenness inhibitor, a cissing inhibitor, and a polymerizable monomer may be contained. In addition, a polymerization inhibitor, an antioxidant, an ultraviolet absorbing agent, a light stabilizer, a color material, metal oxide fine particles, and the like can be further added to the above liquid crystal composition as needed, in a range that does not decrease optical performance.

(Rod-Like Liquid Crystal Compound)

Examples of rod-like liquid crystal compounds that can be used in the present disclosure are rod-like nematic liquid crystal compounds. For examples of the above rod-like nematic liquid crystal compounds, azomethines, azoxys, cyanobiphenyls, cyanophenyl esters, benzoates, phenyl cyclohexanecarboxylate esters, cyanophenylcyclohexanes, cyano-substituted phenylpyrimidines, phenyldioxanes, tolanes, and alkenylcyclohexylbenzonitriles are preferably used. Not only low molecular liquid crystal compounds, but also polymer liquid crystal compounds can be used.

The rod-like liquid crystal compound utilized in the present disclosure may be polymerizable or non-polymerizable. Rod-like liquid crystal compounds having no polymerizable groups are described in various documents (for example, Y. Goto et. al., Mol. Cryst. Liq. Cryst. 1995, Vol. 260, pp. 23-28). A polymerizable rod-like liquid crystal compound can be obtained by introducing a polymerizable group into a rod-like liquid crystal compound. Examples of the polymerizable group include unsaturated polymerizable groups, an epoxy group, and an aziridinyl group. Unsaturated polymerizable groups are preferred, and ethylenic unsaturated polymerizable groups are particularly preferred. The polymerizable group can be introduced into the molecule of the rod-like liquid crystal compound by various methods. The number of polymerizable groups that the polymerizable rod-like liquid crystal compound has is preferably 1 to 6, more preferably 1 to 3. Examples of the polymerizable rod-like liquid crystal compound include compounds described in Makromol. Chem., Vol. 190, p. 2255 (1989), Advanced Materials Vol. 5, p. 107 (1993), U.S. Pat. Nos. 4,683,327, 5,622,648, 5,770,107, International Publication No. WO 95/22586, International Publication No. WO 95/24455, International Publication No. WO 97/00600, International Publication No. WO 98/23580, International Publication No. WO 98/52905, Japanese Laid-Open Patent Publication No. 1-272551, Japanese Laid-Open Patent Publication No. 6-16616, Japanese Laid-Open Patent Publication No. 7-110469, Japanese Laid-Open Patent Publication No. 11-80081, and Japanese Laid-Open Patent Publication No. 2001-328973. As the rod-like liquid crystal compound, two or more types of polymerizable rod-like liquid crystal compounds may be used in combination. When two or more types of polymerizable rod-like liquid crystal compounds are used in combination, the orientation temperature can be decreased.

(Optically Active Compound (Chiral Agent))

The above liquid crystal composition exhibits a cholesteric liquid crystal phase and therefore preferably contains an optically active compound. However, when the above rod-like liquid crystal compound is a molecule having an asymmetric carbon atom, a cholesteric liquid crystal phase can sometimes be stably formed even without adding an optically active compound. The above optically active compound can be selected from known various chiral agents (for example, described in Ekisho Debaisu Handobukku (Liquid Crystal Device Handbook), Chapter 3, Section 4-3, TN, STN yo Kairaruzai (Chiral Agents for TN and STN), p. 199, 142nd Committee of Japan Society for the Promotion of Science ed., 1989). An optically active compound generally includes an asymmetric carbon atom, but an axial asymmetric compound or a planar asymmetric compound comprising no asymmetric carbon atom can also be used as the chiral agent. Examples of the axial asymmetric compound or the planar asymmetric compound include binaphthyl, helicenes, paracyclophanes, and derivatives thereof. The optically active compound (chiral agent) may have a polymerizable group. When the optically active compound has a polymerizable group, and the rod-like liquid crystal compound used in combination also has a polymerizable group, a polymer having a repeating unit derived from the rod-like liquid crystal compound and a repeating unit derived from the optically active compound can be formed by the polymerization reaction of the polymerizable optically active compound and the polymerizable rod-like liquid crystal compound. In this form, the polymerizable group that the polymerizable optically active compound has is preferably the same type of group as the polymerizable group that the polymerizable rod-like liquid crystal compound has. Therefore, the polymerizable group of the optically active compound is also preferably an unsaturated polymerizable group, an epoxy group, or an aziridinyl group, further preferably an unsaturated polymerizable group, and particularly preferably an ethylenic unsaturated polymerizable group. In addition, the optically active compound may be a liquid crystal compound.

The optically active compound is in the above liquid crystal composition present in an amount of preferably 0.1 parts by weight or more and 20 parts by weight or less, more preferably 1 part by weight or more and 10 parts by weight or less, based on 100 parts by weight of the liquid crystal compound used in combination. The amount of the optically active compound used is preferably smaller because liquid crystallinity is often not influenced. Therefore, for the optically active compound used as a chiral agent, a compound having strong twisting power so that twisted orientation with the desired helical pitch can be achieved even with a small amount is preferred. Examples of such a chiral agent exhibiting strong twisting power include a chiral agent described in Japanese Laid-Open Patent Publication No. 2003-287623, and it can be preferably used in the present disclosure.

(Polymerization Initiator)

The liquid crystal composition used for the formation of the above light reflection layers is preferably a polymerizable liquid crystal composition and therefore preferably contains a polymerization initiator. In the present disclosure, the curing reaction is allowed to proceed by ultraviolet irradiation, and therefore the polymerization initiator used is preferably a photopolymerization initiator capable of initiating a polymerization reaction by ultraviolet irradiation. The above photopolymerization initiator is not particularly limited. Examples thereof include acetophenone compounds such as 2-methyl-1-[4-(methylthio)phenyl]-2-morpholino-propan-1-one ("IRGACURE 907" manufactured by Ciba Specialty Chemicals, Inc.), 1-hydroxycyclohexyl phenyl ketone ("IRGACURE 184" manufactured by Ciba Specialty Chemicals), 4-(2-hydroxyethoxy)-phenyl (2-hydroxy-2-propyl) ketone ("IRGACURE 2959" manufactured by Ciba Specialty Chemicals), 1-(4-dodecylphenyl)-2-hydroxy-2-methylpropan-1-one ("DAROCUR 953" manufactured by Merck, Ltd.), 1-(4-isopropylphenyl)-2-hydroxy-2-methyl-propan-1-one ("DAROCUR 1116" manufactured by Merck), 2-hydroxy-2-methyl-1-phenylpropan-1-one ("IRGACURE 1173" manufactured by Ciba Specialty Chemicals), and diethoxyacetophenone, benzoin compounds such as benzoin, benzoin methyl ether, benzoin ethyl ether, benzoin isopropyl ether, benzoin isobutyl ether, and 2,2-dimethoxy-2-phenylacetophenone ("IRGACURE 651" manufactured by Ciba Specialty Chemicals), benzophenone compounds such as benzoylbenzoic acid, methyl benzoylbenzoate, 4-phenylbenzophenone, hydroxybenzophenone, 4-benzoyl-4'-methyldiphenyl sulfide, and 3,3'-dimethyl-4-methoxybenzophenone ("KAYACURE MBP" manufactured by Nippon Kayaku Co., Ltd.), and thioxanthone compounds such as thioxanthone, 2-chlorothioxanthone ("KAYACURE CTX" manufactured by Nippon Kayaku Co., Ltd.), 2-methylthioxanthone, 2,4-dimethylthioxanthone ("KAYACURE RTX" manufactured by Nippon Kayaku Co., Ltd.), isopropylthioxanthone, 2,4-dichlorothioxanthone ("KAYACURE CTX" manufactured by Nippon Kayaku Co., Ltd.), 2,4-diethylthioxanthone ("KAYACURE DETX" manufactured by Nippon Kayaku Co., Ltd.), and 2,4-diisopropylthioxanthone ("KAYACURE DITX" manufactured by Nippon Kayaku Co., Ltd.). These photopolymerization initiators may be used alone, or two or more of these photopolymerization initiators may be used in combination.

The content of the above photopolymerization initiator in the composition is not particularly limited but is preferably 0.5 part by weight or more and 10 parts by weight or less, more preferably 2 parts by weight or more and 8 parts by weight or less, based on 100 parts by weight of the above polymerizable liquid crystal compound.

When the above benzophenone compounds and the above thioxanthone compounds are used as the above photopolymerization initiator, a reaction aid is preferably used in combination in order to promote the photopolymerization reaction. The above reaction aid is not particularly limited. Examples thereof include amine compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy)ethyl 4-dimethylaminobenzoate, and isoamyl 4-dimethylaminobenzoate.

The content of the above reaction aid in the above polymerizable liquid crystal composition is not particularly limited, but the reaction aid is preferably used in a range that does not influence the liquid crystallinity of the above polymerizable liquid crystal composition. The content of the above reaction aid is preferably 0.5 part by weight or more and 10 parts by weight or less, more preferably 8 parts by weight or less, based on 100 parts by weight of the total of the above polymerizable liquid crystal compound and the ultraviolet curable polymerizable compound. In addition, the content of the above reaction aid is preferably an amount 0.5 to 2 times the content of the above photopolymerization initiator.

(Solvent)

A solvent is further contained in the above liquid crystal composition. Such a solvent is not particularly limited as long as it can dissolve the liquid crystal compound, the chiral agent, and the like used. Examples of the solvent include methyl ethyl ketone, toluene, methyl isobutyl ketone, cyclopentanone, acetone, and anisole. Preferred examples include cyclopentanone having good solubility. These solvents can be added in any proportion, and only one type may be added, or a plurality of solvents may be used in combination. These solvents are dried and removed in an oven or the drying zone of a film coater line.

(Additives)

Further, it is also possible to add additives such as a leveling agent, an antifoaming agent, an ultraviolet absorbing agent, a light stabilizer, an antioxidant, a polymerization inhibitor, a crosslinking agent, a plasticizer, inorganic fine particles, and a filler in any proportion to the above liquid crystal composition as needed, to provide the functions that the respective additives have to the above liquid crystal composition. Examples of the leveling agent include fluorine-based compounds, silicone-based compounds, and acrylic compounds. Examples of the ultraviolet absorbing agent include benzotriazole-based compounds, benzophenone-based compounds, and triazine-based compounds. Examples of the light stabilizer include hindered amine-based compounds and benzoate-based compounds. Examples of the antioxidant include phenolic compounds. Examples of the polymerization inhibitor include methoquinone, methylhydroquinone, and hydroquinone. Examples of the crosslinking agent include polyisocyanates and melamine compounds. Examples of the plasticizer include phthalates such as dimethyl phthalate and diethyl phthalate, trimellitates such as tris(2-ethylhexyl) trimellitate, aliphatic dibasic acid esters such as dimethyl adipate and dibutyl adipate, orthophosphates such as tributyl phosphate and triphenyl phosphate, and acetates such as glycerol triacetate and 2-ethylhexyl acetate.

<Material for Adhesion Layer Formation>

In the light reflection film of the present disclosure, the light reflection layers can be laminated via adhesion layers as needed. Considering the application of the light reflection film of the present disclosure to an optical member, the material for forming such an adhesion layer is preferably transparent. Examples of transparent resins that can be used for the material for adhesion layer formation include acrylic resins and epoxy-based resins.

(Acrylic Resin)

An acrylic resin includes an acrylic monomer or oligomer as the main component and is cured by anionic polymerization, radical polymerization, or redox polymerization. Examples of such an acrylic resin include anionically polymerizable instant adhesives comprising 2-cyanoacrylates as the main components, redox-polymerizable acrylic adhesives comprising methacrylates as the main components, and ultraviolet curable adhesives radical-polymerizable by ultraviolet irradiation comprising polyfunctional acrylates or polyfunctional methacrylates as the main components. The ultraviolet curable adhesive includes a (meth)acrylate-based monomer, a photopolymerization initiator, and additives.

Examples used as the acrylic resin include trimethylolpropane tri(meth)acrylate, pentaerythritol tri(meth)acrylate, pentaerythritol tetra(meth)acrylate, ditrimethylolpropane tetra(meth)acrylate, dipentaerythritol pentaacrylate, dipentaerythritol hexaacrylate, the reaction product of pentaerythritol tri(meth)acrylate and 1,6-hexamethylene diisocyanate, the reaction product of pentaerythritol tri(meth)acrylate and isophorone diisocyanate, tris(acryloxyethyl) isocyanurate, tris(methacryloxyethyl) isocyanurate, the reaction product of glycerol triglycidyl ether and (meth)acrylic acid, caprolactone-modified tris(acryloxyethyl) isocyanurate, the reaction product of trimethylolpropane triglycidyl ether and (meth)acrylic acid, triglycerol di(meth)acrylate, the reaction product of propylene glycol diglycidyl ether and (meth)acrylic acid, polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth)acrylate, the reaction product of 1,6-hexanediol diglycidyl ether and (meth)acrylic acid, 1,6-hexanediol di(meth)acrylate, glycerol di(meth)acrylate, the reaction product of ethylene glycol diglycidyl ether and (meth)acrylic acid, the reaction product of diethylene glycol diglycidyl ether and (meth)acrylic acid, bis(acryloxyethyl)hydroxyethyl isocyanurate, bis(methacryloxyethyl)hydroxyethyl isocyanurate, the reaction product of bisphenol A diglycidyl ether and (meth)acrylic acid, tetrahydrofurfuryl (meth)acrylate, caprolactone-modified tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxyhydroxypropyl (meth)acrylate, acryloylmorpholine, methoxypolyethylene glycol (meth)acrylate, methoxytetraethylene glycol (meth)acrylate, methoxytriethylene glycol (meth)acrylate, methoxyethylene glycol (meth)acrylate, methoxyethyl (meth)acrylate, glycidyl (meth)acrylate, glycerol (meth)acrylate, ethylcarbitol (meth)acrylate, 2-ethoxyethyl (meth)acrylate, N,N-dimethylaminoethyl (meth)acrylate, 2-cyanoethyl (meth)acrylate, the reaction product of butyl glycidyl ether and (meth)acrylic acid, butoxytriethylene glycol (meth)acrylate, and butanediol mono(meth)acrylate. These compounds may be used alone, or a plurality of these compounds may be mixed and used.

(Epoxy-Based Resin)

An epoxy-based resin includes an epoxy resin, a curing agent, preferably an amine-based compound or an acid anhydride, and a metal catalyst as components. The epoxy resin is not particularly limited as long as it has two or more epoxy groups in one molecule. Examples of the epoxy resin include bisphenol A type epoxy resins, bisphenol F type epoxy resins, bisphenol S type epoxy resins, phenol novolac type epoxy resins, alicyclic epoxy resins, heterocyclic epoxy resins, glycidyl ester-based epoxy resins, glycidyl amine-based epoxy resins, bromo-containing epoxy resins, hydrogenated bisphenol A type epoxy resins, aliphatic epoxy resins such as propylene glycol glycidyl ether and pentaerythritol polyglycidyl ether, and urethane-modified epoxy resins. Two or more of these epoxy resins may be mixed and used. In addition, for viscosity decrease, a monoepoxy compound such as butyl glycidyl ether, phenyl glycidyl ether, cresyl glycidyl ether, or a glycidyl ether of an aliphatic alcohol may be blended as needed.

In addition, in the present disclosure, a pressure-sensitive adhesive can also be utilized. As the pressure-sensitive adhesive, rubber-based, acrylic, and silicone-based pressure-sensitive adhesives and the like can be used, and particularly acrylic pressure-sensitive adhesives are desired.

(Pressure-Sensitive Adhesive)

Examples of the acrylic pressure-sensitive adhesives include a pressure-sensitive adhesive using a (meth)acrylic polymer obtained by copolymerizing an alkyl (meth)acrylate ester and another (meth)acrylic monomer component.

Examples of the above alkyl (meth)acrylate ester include ethyl (meth)acrylate, isopropyl (meth)acrylate, n-butyl (meth)acrylate, isobutyl (meth)acrylate, pentyl (meth)acrylate, 2-ethylhexyl (meth)acrylate, isooctyl (meth)acrylate, n-octyl (meth)acrylate, isononyl (meth)acrylate, decyl (meth)acrylate, and lauryl (meth)acrylate.

Examples of the another (meth)acrylic monomer component include carboxyl group-containing monomers such as acrylic acid, methacrylic acid, itaconic acid, crotonic acid, maleic acid, and fumaric acid, hydroxyl group-containing monomers such as 2-hydroxyethyl (meth)acrylate, 2-hydroxypropyl (meth)acrylate, 4-hydroxybutyl (meth)acrylate, polyoxypropylene (meth)acrylate, and caprolactone-modified (meth)acrylate, nitrogen-containing monomers such as N-vinylpyrrolidone, N-vinylcaprolactam, acryloylmorpholine, (meth)acrylamide, dimethylaminoethyl (meth)acrylate, diethylaminoethyl (meth)acrylate, and dimethylaminopropyl (meth)acrylate, and epoxy group-containing monomers such as glycidyl (meth)acrylate.

A solvent may be added to a coating liquid of the adhesive or the pressure-sensitive adhesive used in the present disclosure for viscosity adjustment and coating property improvement. Examples of the solvent include acetates such as ethyl acetate, butyl acetate, and methyl acetate, alcohols such as methanol, ethanol, propanol, isopropanol, and benzyl alcohol, ketones such as 2-butanone, acetone, cyclopentanone, and cyclohexanone, basic solvents such as benzylamine, triethylamine, and pyridine, and nonpolar solvents such as cyclohexane, benzene, toluene, xylene, anisole, hexane, and heptane. These solvents can be added in any proportion, and only one type may be added, or a plurality of components may be blended. These solvents are dried and removed in an oven or the drying zone of a film coater line.

<Substrate>

The laminate of the present disclosure has a substrate as one or both outermost layer(s) of the light reflection film. The material and optical properties of the substrate are not limited in any way as long as the substrate has self-supporting properties. Depending on the application, high transparency to ultraviolet light is required. In addition, the light reflection film of the present disclosure and the substrate may be laminated using an adhesive, as needed. The shape of the substrate may be a film shape or a three-dimensional structure having a curved surface shape or the like, and the substrate is manufactured by controlling a substrate production process so as to satisfy predetermined optical properties.

For the substrate used in the laminate of the present disclosure, the use of a polymer film having high visible light transmission properties is preferred. Examples thereof include various polymer films for optical films used as members of displays such as liquid crystal displays. Examples of such substrates include polyester films such as polyethylene terephthalate (PET), polybutylene terephthalate, and polyethylene naphthalate (PEN); polycarbonate (PC) films, polymethyl methacrylate films, and polyolefin films such as polyethylene and polypropylene. Among them, polyethylene terephthalate, triacetyl cellulose, and polycarbonates are preferred. Examples of substrates other than polymer films include glass substrates.

In order to more precisely define the orientation direction of the liquid crystal compound in the cholesteric liquid crystal phase, a surface of the substrate may be oriented. In order to orient a surface of the substrate, a surface of the substrate is preferably subjected to rubbing treatment to form an orientation surface, and an orientation layer may be provided on a surface of the substrate as mentioned below.

<Orientation Layer>

The laminate of the present disclosure may have an orientation layer between the light reflection layer of the cholesteric liquid crystal phase laminated in the light reflection film and the substrate. The orientation layer has the function of more precisely defining the orientation direction of the liquid crystal compound in the cholesteric liquid crystal phase. The orientation layer can be provided by means such as the rubbing treatment of an organic compound (preferably a polymer), the oblique evaporation of an inorganic compound, or the formation of a layer having microgrooves. Further, an orientation layer in which an orientation function occurs by the application of an electric field, the application of a magnetic field, or light irradiation is also known. The orientation layer is preferably formed on a surface of a film of a polymer by rubbing treatment.

The orientation layer preferably has some adhesive force to each of the adjacent light reflection layer and substrate. For example, when orientation layers are inserted into a laminate having three light reflection layers in which cholesteric liquid crystal phases are fixed, first, two laminates having orientation layers between light reflection layers and substrates are provided, and the laminate [1] (light reflection layer [1]/orientation layer [1]/substrate [1]) and the laminate [2] (light reflection layer [2]/orientation layer [2]/substrate [2]) are bonded using an adhesive, to fabricate a laminate [A] forming the layer configuration of substrate [1]/orientation layer [1]/light reflection layer [1]/adhesive/light reflection layer [2]/orientation layer [2]/substrate [2]. Then, one orientation layer [2]/substrate [2] (laminate [2] side) is peeled, and further, similarly, a previously provided laminate [3] having an orientation layer between a light reflection layer and a substrate (light reflection layer [3]/orientation layer [3]/substrate [3]) and the laminate [A] fabricated as described above are laminated using an adhesive, to fabricate a laminate of substrate [1]/orientation layer [1]/light reflection layer [1]/adhesive/light reflection layer [2]/adhesive/light reflection layer [3]/orientation layer [3]/substrate [3]. Therefore, the orientation layer is desirably inserted with such weak peel force that it can be peeled at either the interface between the light reflection layer in which the cholesteric liquid crystal phase is fixed and the orientation layer or the interface between the substrate and the orientation layer. The interface at which the orientation layer is peeled is not particularly limited, but considering fabricating the laminate [3] in the subsequent step, the orientation layer is preferably peeled at the interface between the light reflection layer and the orientation layer.

As the material used as the orientation layer, polymers of organic compounds are preferred, and polymers crosslinkable in themselves or polymers to be crosslinked with crosslinking agents are often used. Of course, polymers having both functions are also used. Examples of the polymers can include polymers such as polymethyl methacrylate, acrylic acid/methacrylic acid copolymers, styrene/maleinimide copolymers, polyvinyl alcohol and modified polyvinyl alcohol, poly(N-methylolacrylamide), styrene/vinyltoluene copolymers, chlorosulfonated polyethylene, nitrocellulose, polyvinyl chloride, chlorinated polyolefins, polyesters, polyimides, vinyl acetate/vinyl chloride copolymers, ethylene/vinyl acetate copolymers, carboxymethyl cellulose, gelatin, polyethylene, polypropylene, and polycarbonates and compounds such as silane coupling agents. Examples of preferred polymers are water-soluble polymers such as poly(N-methylolacrylamide), carboxymethyl cellulose, gelatin, and polyvinyl alcohol and modified polyvinyl alcohol and can further preferably include gelatin and polyvinyl alcohol and modified polyvinyl alcohol. The thickness of the above orientation layer is preferably 0.1 to 2.0 μm.

EXAMPLES

The present disclosure will be described in more detail based on the following examples. It is to be noted that the present disclosure is not limited to examples shown below.

<Preparation of Coating Liquids (Liquid Crystal Compositions)>

Coating liquids (R) and (L) having compositions shown in the following Table 1 and Table 2 were each prepared.

TABLE 1

Table of compositions of coating liquids (R)

| Material | Material name (manufacturer) | Amount formulated (g) | | | | | | | | | |
|---|---|---|---|---|---|---|---|---|---|---|---|
| | | R1 | R2 | R3 | R4 | R5 | R6 | R7 | R8 | R9 | R10 |
| Rod-like liquid crystal compound | LC-242 (BASF) | 10.00 | 10.00 | 10.00 | 10.00 | 10.00 | 10.00 | 10.00 | 10.00 | 10.00 | 10.00 |
| Chiral agent | LC-756 (BASF) | 0.73 | 0.67 | 0.63 | 0.60 | 0.56 | 0.35 | 0.32 | 0.31 | 0.30 | 0.28 |
| Polymerization initiator | Lucirin TPO (BASF) | 0.54 | 0.53 | 0.53 | 0.53 | 0.53 | 0.52 | 0.52 | 0.52 | 0.51 | 0.51 |
| Solvent | Cyclopentanone | 27.22 | 27.07 | 26.97 | 26.88 | 26.77 | 26.26 | 26.19 | 26.15 | 26.12 | 26.07 |

TABLE 2

Table of compositions of coating liquids (L)

| Material | Material name (manufacturer) | Amount formulated (g) | | | |
|---|---|---|---|---|---|
| | | L1 | L2 | L3 | L4 |
| Rod-like liquid crystal compound | LC-242 (BASF) | 10.00 | 10.00 | 10.00 | 10.00 |
| Chiral agent | Compound1 | 1.86 | 1.74 | 1.63 | 0.79 |
| Polymerization initiator | Lucirin TPO (BASF) | 0.59 | 0.59 | 0.58 | 0.54 |
| Solvent | Cyclopentanone | 30.08 | 29.77 | 29.50 | 27.37 |

Chiral agent: Compound 1 (a compound described in Japanese Laid-Open Patent Publication No. 2002-179668)

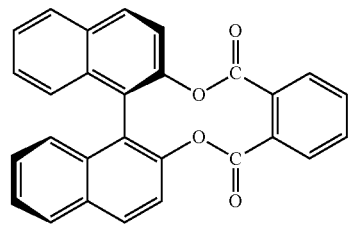

<Preparation of Adhesive>

An adhesive having the composition shown in the following Table 3 was prepared.

TABLE 3

Table of composition of adhesive (S1)

| Material (Type) | Material name | Amount formulated (g) |
|---|---|---|
| Pressure-sensitive adhesive | Acrylic pressure-sensitive adhesive SK-Dyne 906 (manufactured by Soken Chemical & Engineering Co., Ltd.) | 10.00 |
| Solvent | Methyl ethyl ketone | 5.00 |

<Fabrication of Light Reflection Layers>

Using 14 types of coating liquids (R1 to R10) and (L1 to L4) prepared, each coating film of a cholesteric liquid crystal (light reflection layer) was made by the following procedure, and the selective reflection center wavelength was evaluated. As the substrate, a PET film (trade name A4100, thickness 50 μm) manufactured by Toyobo Co., Ltd. that was subjected to rubbing treatment and had no primer layer was used.

(1) The PET film was coated with each coating liquid at room temperature using a wire bar, so that the thickness of the film after drying was 3 μm.
(2) The coated PET film was heated at 150° C. for 5 minutes to remove the solvent and form a cholesteric liquid crystal phase. Then, UV irradiation was performed by a high pressure mercury lamp (manufactured by HARISON TOSHIBA LIGHTING Corporation: HX4000L) with an output of 120 W for 5 to 10 seconds to fix the cholesteric liquid crystal phase to make a cholesteric liquid crystal coating film (light reflection layer).
(3) Using a spectrophotometer MPC-3100 manufactured by SHIMADZU CORPORATION, the reflection spectrum of each of the fabricated cholesteric liquid crystal coating films (R1 to R10 and L1 to L4) was measured, and the selective reflection center wavelength was obtained. The obtained results are described in the following Tables 4 and 5.

TABLE 4

Selective reflection center wavelengths of cholesteric liquid crystal coating films (R1 to R10)

| | R1 | R2 | R3 | R4 | R5 | R6 | R7 | R8 | R9 | R10 |
|---|---|---|---|---|---|---|---|---|---|---|
| Selective reflection center wavelength | 470 nm | 510 nm | 540 nm | 570 nm | 610 nm | 930 nm | 1010 nm | 1050 nm | 1090 nm | 1170 nm |

TABLE 5

Selective reflection center wavelengths of cholesteric liquid crystal coating films (L1 to L4)

| | L1 | L2 | L3 | L4 |
|---|---|---|---|---|
| Selective reflection center wavelength | 510 nm | 540 nm | 570 nm | 1050 nm |

<Fabrication of Light Reflection Films>

Example 1

The surface of the cholesteric liquid crystal coating film of R1 fabricated in the above (1) to (2) was coated with the adjusted adhesive (S1) using a wire bar, so that the thickness of the film after drying was 10 μm. The coated cholesteric liquid crystal coating film was heated at 40° C. for 1 minute to remove the solvent, and then combined with the surface of the cholesteric liquid crystal coating film of L2 using a hand roller. UV irradiation was performed by a high pressure mercury lamp (HX4000L manufactured by HARISON TOSHIBA LIGHTING Corporation) with an output of 120 W for 5 to 10 seconds for curing, to laminate two layers of the light reflection layer (R1) comprising the cholesteric liquid crystal layer of R1, and the light reflection layer (L2) comprising the cholesteric liquid crystal layer of L2. Then, the PET film on the light reflection layer (L2) side was peeled, and the surface of the cholesteric liquid crystal coating film of L2 on the side on which the PET film was peeled was coated with the adhesive (S1) using a wire bar, so that the thickness of the film after drying was 10 μm. The cholesteric liquid crystal coating film of R5 was laminated in a manner similar to that of the procedure by which two light reflection layers were laminated, and then the PET film on the light reflection layer (R1) side and the PET film on the light reflection layer (R5) side were each peeled to fabricate a light reflection film (light reflection layer (R1)/light reflection layer (L2)/light reflection layer (R5)) in which three layers of the light reflection layer (R) comprising the cholesteric liquid crystal layer of R1, the light reflection layer (L2) comprising the cholesteric liquid crystal layer of L2, and the light reflection layer (R5) comprising the cholesteric liquid crystal layer of R5 were laminated.

Example 2

A light reflection film (light reflection layer (R2)/light reflection layer (L2)/light reflection layer (R4)) in which three layers of the light reflection layer (R2) comprising the cholesteric liquid crystal layer of R2, the light reflection layer (L2) comprising the cholesteric liquid crystal layer of L2, and the light reflection layer (R4) comprising the cholesteric liquid crystal layer of R4 were laminated was fabricated by a procedure similar to that in Example 1 except that the liquid crystal coating liquids (R2), (L2), and (R4) for coating were used.

Example 3

A light reflection film (light reflection layer (L2)/light reflection layer (R2)/light reflection layer (R4)) in which three layers of the light reflection layer (L2) comprising the cholesteric liquid crystal layer of L2, the light reflection layer (R2) comprising the cholesteric liquid crystal layer of R2, and the light reflection layer (R4) comprising the cholesteric liquid crystal layer of R4 were laminated was fabricated by a procedure similar to that in Example 2 except that the liquid crystal coating liquids (L2), (R2), and (R4) for coating were used, and the lamination configuration of the light reflection layer (L2) and the light reflection layer (R2) was reversed.

Example 4

A light reflection film (light reflection layer (L1)/light reflection layer (R3)/light reflection layer (L3)) in which three layers of the light reflection layer (L1) comprising the cholesteric liquid crystal layer of L1, the light reflection layer (R3) comprising the cholesteric liquid crystal layer of R3, and the light reflection layer (L3) comprising the cholesteric liquid crystal layer of L3 were laminated was fabricated by a procedure similar to that in Example 1 except that the liquid crystal coating liquids (L1), (R3), and (L3) for coating were used.

Example 5

A light reflection film (light reflection layer (R2)/light reflection layer (L2)/light reflection layer (R5)) in which three layers of the light reflection layer (R2) comprising the cholesteric liquid crystal layer of R2, the light reflection layer (L2) comprising the cholesteric liquid crystal layer of L2, and the light reflection layer (R5) comprising the cholesteric liquid crystal layer of R5 were laminated was fabricated by a procedure similar to that in Example 1 except that the liquid crystal coating liquids (R2), (L2), and (R5) for coating were used.

Example 6

A light reflection film (light reflection layer (R6)/light reflection layer (L4)/light reflection layer (R10)) in which three layers of the light reflection layer (R6) comprising the cholesteric liquid crystal layer of R6, the light reflection layer (L4) comprising the cholesteric liquid crystal layer of L4, and the light reflection layer (R10) comprising the cholesteric liquid crystal layer of R10 were laminated was fabricated by a procedure similar to that in Example 1 except that the liquid crystal coating liquids (R6), (L4), and (R10) for coating were used.

Example 7

A light reflection film (light reflection layer (R7)/light reflection layer (L4)/light reflection layer (R9)) in which three layers of the light reflection layer (R7) comprising the cholesteric liquid crystal layer of R7, the light reflection layer (L4) comprising the cholesteric liquid crystal layer of L4, and the light reflection layer (R9) comprising the cholesteric liquid crystal layer of R9 were laminated was fabricated by a procedure similar to that in Example 1 except that the liquid crystal coating liquids (R7), (L4), and (R9) for coating were used.

Comparative Example 1

A light reflection film (light reflection layer (R3)/light reflection layer (L2)/light reflection layer (R3)) in which three layers of the light reflection layer (R3) comprising the cholesteric liquid crystal layer of R3, the light reflection layer (L2) comprising the cholesteric liquid crystal layer of L2, and the light reflection layer (R3) comprising the cholesteric liquid crystal layer of R3 were laminated was fabricated by a procedure similar to that in Example 1 except that the liquid crystal coating liquids (R3), (L2), and (R3) for coating were used.

Comparative Example 2

A light reflection film (light reflection layer (R1)/light reflection layer (R3)/light reflection layer (R5)) in which three layers of the light reflection layer (R1) comprising the cholesteric liquid crystal layer of R1, the light reflection layer (R3) comprising the cholesteric liquid crystal layer of R3, and the light reflection layer (R5) comprising the cholesteric liquid crystal layer of R5 were laminated was fabricated by a procedure similar to that in Example 1 except that the liquid crystal coating liquids (R1), (R3), and (R5) for coating were used.

Comparative Example 3

A light reflection film (light reflection layer (R1)/light reflection layer (R3)/light reflection layer (R5)) in which three layers of the light reflection layer (R1) comprising the cholesteric liquid crystal layer of R1, the light reflection layer (R3) comprising the cholesteric liquid crystal layer of R3, and the light reflection layer (R5) comprising the cholesteric liquid crystal layer of R5 were laminated was fabricated by a procedure similar to that in Example 1 except that the liquid crystal coating liquids (R1), (R3), and (R5) for coating were used, and the thickness per light reflection layer was 10 μm.

Comparative Example 4

A light reflection film (light reflection layer (R8)/light reflection layer (L4)/light reflection layer (R8)) in which three layers of the light reflection layer (R8) comprising the cholesteric liquid crystal layer of R8, the light reflection layer (L4) comprising the cholesteric liquid crystal layer of L4, and the light reflection layer (R8) comprising the cholesteric liquid crystal layer of R8 were laminated was fabricated by a procedure similar to that in Example 1 except that the liquid crystal coating liquids (R8), (L4), and (R8) for coating were used.

Comparative Example 5

A light reflection film (light reflection layer (R6)/light reflection layer (R8)/light reflection layer (R10)) in which three layers of the light reflection layer (R6) comprising the cholesteric liquid crystal layer of R6, the light reflection layer (R8) comprising the cholesteric liquid crystal layer of R8, and the light reflection layer (R10) comprising the cholesteric liquid crystal layer of R10 were laminated was fabricated by a procedure similar to that in Example 1 except that the liquid crystal coating liquids (R6), (R8), and (R10) for coating were used.

[Spectral Performance Evaluation]

Using a spectrophotometer MPC-3100 manufactured by SHIMADZU CORPORATION, the reflection spectrum of each of the light reflection films fabricated in Examples 1, 2, 3, 4, 5, 6, and 7 and Comparative Examples 1, 2, 3, 4, and 5 was measured, and the selective reflection center wavelength, the maximum reflectance, and the width of the reflection band having a reflectance of more than 50% were obtained. The obtained results are described in the following Table 6.

[Haze (Hz) Evaluation]

For each of the light reflection films fabricated in Examples 1, 2, 3, 4, 5, 6, and 7 and Comparative Examples 1, 2, 3, 4, and 5, the evaluation of haze was performed using a haze meter manufactured by Nippon Denshoku. The obtained results are described in the following Table 6.

TABLE 6

| | Example 1 | Example 2 | Example 3 | Example 4 | Example 5 | Comparative Example 1 | Comparative Example 2 |
|---|---|---|---|---|---|---|---|
| Reference wavelength region | | | Visible light region | | | | |
| Helical structure (R: right-handed L: left-handed) | R/L/R | R/L/R | L/R/R | L/R/L | R/L/R | R/L/R | R/R/R |

TABLE 6-continued

| | | | | | | | |
|---|---|---|---|---|---|---|---|
| Interval between selective reflection center wavelengths of two adjacent light reflection layers (nm) | 70 \| 70 | 30 \| 30 | 30 \| 30 | 30 \| 30 | 30 \| 70 | 0 \| 0 | 70 \| 70 |
| Width of reflection band of more than 50% (nm) | 183 | 110 | 110 | 114 | 153 | 76 | 0 |
| Maximum reflectance (%) | 65.8 | 91.8 | 92.0 | 90.2 | 84.6 | 92.4 | 48.8 |
| Diffuse transmittance (%) | 0.3 | 0.3 | 0.3 | 0.3 | 0.3 | 0.3 | 0.3 |
| Total light transmittance (%) | 46.8 | 45.2 | 45.4 | 46.0 | 45.8 | 41.4 | 56.8 |
| Haze value (%) | 0.8 | 0.8 | 0.8 | 0.8 | 0.8 | 0.8 | 0.6 |

| | Comparative Example 3 | Comparative Example 6 | Comparative Example 7 | Comparative Example 4 | Comparative Example 5 |
|---|---|---|---|---|---|
| Reference wavelength region | Visible light region | | Near-infrared light region | | |
| Helical structure (R: right-handed L: left-handed) | R/R/R | R/L/R | R/L/R | R/L/R | R/R/R |
| Interval between selective reflection center wavelengths of two adjacent light reflection layers (nm) | 70 \| 70 | 120 \| 120 | 40 \| 40 | 0 \| 0 | 120 \| 120 |
| Width of reflection band of more than 50% (nm) | 0 | 289 | 189 | 147 | 0 |
| Maximum reflectance (%) | 46.7 | 65.5 | 89.3 | 89.9 | 46.5 |
| Diffuse transmittance (%) | 0.3 | 0.3 | 0.3 | 0.3 | 0.3 |
| Total light transmittance (%) | 59.5 | 88.3 | 88.3 | 88.3 | 88.6 |
| Haze value (%) | 16.6 | 0.3 | 0.3 | 0.3 | 0.3 |

As shown in the above Table 6, in the light reflection film of Example 1 in which light reflection layers are laminated in the order of: a light reflection layer in which a cholesteric liquid crystal phase of right-handed helical structure is fixed; a light reflection layer in which a cholesteric liquid crystal phase of a left-handed helical structure is fixed; and a light reflection layer in which a cholesteric liquid crystal phase of a right-handed helical structure is fixed, and the selective reflection center wavelengths of two adjacent light reflection layers are each shifted by an interval of 70 nm in the visible light region, the reflection band having a reflectance of more than 50% is 183 nm. In the light reflection film of Example 2 in which the selective reflection center wavelengths of two adjacent light reflection layers are each shifted by an interval of 30 nm, the reflection band having a reflectance of more than 50% is 110 nm. On the other hand, in the light reflection film of Comparative Example 1 in which light reflection layers all having the same selective reflection center wavelength are laminated, the reflection band having a reflectance of more than 50% is 76 nm, and this is the width of the reflection band (about 76 nm) equivalent to that in a case where two layers of a light reflection layer RPRL and a light reflection layer LPRL both having the same selective reflection center wavelength and helical pitch in the visible light region are simply laminated. Therefore, in the light reflection film of Example 1 and the light reflection film of Example 2, in the visible light region, the reflection band having a reflectance of more than 50% was 80 nm or more, and a reflectance of more than 50% was exhibited in a wide wavelength band. Therefore, the light reflection film of Example 1 and the light reflection film of Example 2 exhibited high reflection performance compared with the light reflection film of Comparative Example 1.

In addition, in the light reflection film of Comparative Example 2 in which only light reflection layers in which cholesteric liquid crystal phases all having a right-handed helical structure were fixed were laminated, the maximum reflectance was 48.8%, which was 50% or less. On the other hand, the light reflection film of Example 1 exhibited a maximum reflectance of 65.8%, and the light reflection film of Example 2 exhibited a maximum reflectance of 91.8%, and both had a maximum reflectance of more than 50%. Therefore, the light reflection film of Example 1 and the light reflection film of Example 2 each exhibited high reflection performance compared with the light reflection film of Comparative Example 2. On the other hand, in the light reflection film of Comparative Example 3 in which only light reflection layers in which cholesteric liquid crystal phases all having a right-handed helical structure were fixed were laminated, and the thickness per light reflection layer was 10 μm, the maximum reflectance was 46.7%, which was 50% or less, and moreover, orientation defect of the cholesteric liquid crystals occurred due to the thickening of the light reflection layers. As a result, the haze value was 16.6%, which was significantly large, and the light reflection film of Comparative Example 3 was unsuitable for use for an optical member. Further, in each of the light reflection film of Comparative Example 2 and the light reflection film of Comparative Example 3, the reflection band having a reflectance of more than 50% was 0 nm, and the practicality was poor.

The light reflection film of Example 3 different from the light reflection film of Example 2 only in the lamination configuration exhibited high reflection performance similar to that of the light reflection film of Example 2. In addition, the light reflection film of Example 4 different from the light reflection film of Example 2 only in the helical structures of the cholesteric liquid crystal phases in the corresponding respective light reflection layers also exhibited high reflection performance similar to that of Example 2. Therefore, as long as the conditions of the present disclosure are satisfied, a light reflection film exhibiting similar reflection performance can be obtained even if the lamination configuration of the light reflection layers or the helical structures of the cholesteric liquid crystal phases of the light reflection layers are different. In addition, in the light reflection film of Example 5 in which the selective reflection center wavelengths of two adjacent light reflection layers were shifted by an interval of 30 nm and an interval of 70 nm respectively, the reflection band having a reflectance of more than 50% was 153 nm, and a maximum reflectance of 84.6% was exhibited. Therefore, the light reflection film of Example 5 also exhibited high reflection performance similarly to the light reflection films of Examples 1 to 4.

In addition, the light reflection films of Example 1 to Example 5 exhibit a haze value of 0.8%, which is a low numerical value of 1.0% or less. Therefore, the light reflection films of Examples 1 to 5 in the present disclosure are suitable for use for optical members. Particularly, the light reflection film of Example 1 is suitable for an optical member, which is required to have a wider reflection band exhibiting a reflectance of more than 50%. In addition, in the light reflection films of Examples 2 to 4, compared with the light reflection film of Example 1 and the light reflection film of Example 5, the reflection band having a reflectance of more than 50% is narrow, but the maximum reflectance is 90% or more, which is very high. Therefore, the light reflection films of Examples 2 to 4 are particularly suitable for use for optical members of which a higher reflectance is required.

In the light reflection film of Example 6 in which the selective reflection center wavelengths of two adjacent light reflection layers are each shifted by an interval of 120 nm in the near-infrared light region, the reflection band having a reflectance of more than 50% is 289 nm. In the light reflection film of Example 7 in which the selective reflection center wavelengths of two adjacent light reflection layers are each shifted by an interval of 40 nm, the reflection band having a reflectance of more than 50% is 189 nm. On the other hand, in the light reflection film of Comparative Example 4 in which light reflection layers all having the same selective reflection center wavelength are laminated, the reflection band having a reflectance of more than 50% is 147 nm, and this is the width of the reflection band (about 147 nm) equivalent to that in a case where two layers of a light reflection layer RPRL and a light reflection layer LPRL both having the same selective reflection center wavelength and helical pitch in the near-infrared light region are simply laminated. Therefore, in the light reflection film of Example 6 and the light reflection film of Example 7, in the near-infrared light region, the reflection band having a reflectance of more than 50% was 150 nm or more, and a reflectance of more than 50% was exhibited in a wide wavelength band. Therefore, the light reflection film of Example 6 and the light reflection film of Example 7 exhibited high reflection performance compared with the light reflection film of Comparative Example 4. In addition, in the light reflection film of Comparative Example 5 in which only light reflection layers in which cholesteric liquid crystal phases all having a right-handed helical structure were fixed were laminated, the maximum reflectance was 46.5%, which was 50% or less, and moreover, the reflection band having a reflectance of more than 50% was 0 nm, and the practicality was poor.

The light reflection film of the present disclosure exhibits high reflection performance and further a low haze value and therefore is mainly preferred for the application of heat shield films for building materials, in-vehicle use, and the like, optical members such as brightness enhancement films and color filters, and eyewear (sunglasses, goggles, visors for helmets, and the like).

What is claimed is:

1. A method for reflecting light so that a width of a reflection band that reflects more than 50% of light with respect to incident light is 80 nm or more in a visible light region or is 150 nm or more in a near-infrared light region, with only one light reflection film,
    the light reflection film comprising:
        at least one light reflection layer RPRL in which a cholesteric liquid crystal phase of a right-handed helical structure having right circularly polarized light reflection ability is fixed; and
        at least one light reflection layer LPRL in which a cholesteric liquid crystal phase of a left-handed helical structure having left circularly polarized light reflection ability is fixed,
    wherein a total of three or more layers of the light reflection layer(s) RPRL and the light reflection layer(s) LPRL are laminated in the light reflection film, and all of the laminated light reflection layers have a selective reflection center wavelength shifted by an interval of 10 nm or more and 160 nm or less between the laminated light reflection layers.

2. The method according to claim 1, wherein the light reflection film has a region that reflects more than 50% and 95% or less of light with respect to incident light.

3. The method according to claim 1, wherein the light reflection film has a haze value (Hz) of 1.0% or less.

4. The method according to claim 1, wherein each of the laminated light reflection layers has a thickness of 0.5 µm or more and 5 µm or less.

* * * * *